(12) United States Patent
Bettinzoli

(10) Patent No.: US 8,683,653 B2
(45) Date of Patent: Apr. 1, 2014

(54) DOOR HINGE

(75) Inventor: Angelo Bettinzoli, Bareggio (IT)

(73) Assignee: Faringosi Hinges S.R.L., Ospitaletto (BS) (IT)

( * ) Notice: Subject to any disclaimer, the term of this patent is extended or adjusted under 35 U.S.C. 154(b) by 339 days.

(21) Appl. No.: 12/600,298

(22) PCT Filed: May 18, 2007

(86) PCT No.: PCT/IT2007/000355
§ 371 (c)(1),
(2), (4) Date: Nov. 16, 2009

(87) PCT Pub. No.: WO2008/142711
PCT Pub. Date: Nov. 27, 2008

(65) Prior Publication Data
US 2010/0148646 A1    Jun. 17, 2010

(51) Int. Cl.
*E05F 5/02*    (2006.01)
(52) U.S. Cl.
USPC ..................................... 16/286; 16/54; 16/50
(58) Field of Classification Search
USPC ........... 16/286, 49, 50, 51, 52, 53, 54, 57, 58, 16/66, 68, 82, 83, 368, 369, 371; 188/281, 188/282.1, 316, 317
See application file for complete search history.

(56) References Cited

U.S. PATENT DOCUMENTS

| 2,124,349 | A |   | 7/1938  | Herbster |        |
|-----------|---|---|---------|----------|--------|
| 4,102,006 | A | * | 7/1978  | Jenkins  | 16/51  |
| 5,157,806 | A | * | 10/1992 | Wartian  | 16/66  |
| 5,937,481 | A | * | 8/1999  | Faringosi | 16/332 |
| 6,539,581 | B1 | * | 4/2003 | Faringosi | 16/327 |
| 6,957,807 | B2 | * | 10/2005 | Zimmer et al. | 16/66 |
| 7,886,407 | B2 | * | 2/2011 | Resnik et al. | 16/286 |
| 2006/0032019 | A1 | * | 2/2006 | Kistner et al. | 16/286 |

FOREIGN PATENT DOCUMENTS

| DE | 102005045365 | 3/2007  |
| EP |      1731704 | 12/2006 |
| FR |      2349768 | 11/1977 |

* cited by examiner

*Primary Examiner* — Jeffrey O Brien
(74) *Attorney, Agent, or Firm* — Lucas & Mercanti, LLP

(57) ABSTRACT

A hinge (1) for a door opening over a horizontal axis, of the type comprising first and second supports (2, 3) that can be fixed to a compartment structure and to a door, at least rotatably constrained to each other through a pin (10). The hinge (1) comprises a fluidic cylinder-piston damper (9) of the type with internal flow leakage of the fluid contained therein. The damper (9) has a piston (18, 19) with a through-hole (20). The piston (18, 19) can have an appendix (19) that non-sealingly engages a chamber (17) when the door is closed, to increase the dampening. The hinge (1) has elastic means (7) such as a spring, to counteract the falling movement of the door when it is opened. The hinge (1) can be of the cam type, with a cam (4) and an abutment (5).

11 Claims, 3 Drawing Sheets

DOOR HINGE

This application is a 371 of PCT/IT2007/000355 filed on May 18, 2007, the contents of which are incorporated herein by reference.

FIELD OF THE INVENTION

The present invention relates to a hinge for compartment-covering doors, such as those suitable to close an oven compartment, of the type in which the law of motion governing the relative movement of two supports hinged to each other, and respectively fixed to the compartment and door structure, or vice versa, are given by movement guide means, preferably of the cam-follower type, which are interposed between, and operatively connected to, both of the two supports.

BACKGROUND OF THE ART

It is known to provide such type of hinges in which these movement guide means comprise an arm, usually cam-shaped, which is constrained as a rocker arm to one of said hinge supports, such that the one end thereof defines the sliding movement of a moving element relative to the support to which it is constrained, and the other end of the arm, suitably shaped, is instead engaged with an abutment, or follower, which is preferably an idle wheel, mounted to the other hinge support. The movement of said moving element, preferably being a slider, can be hindered, in a sliding and/or rotation direction thereof, by elastic means that are interposed between the moving element and the hinge support relative to which this moving element is moving.

In the case of a door pivoting about a horizontal axis, these elastic means can be arranged such as to balance, at least partially, the weight of the door during the rotation thereof, both in the direction opposing to the gravity force, and in the opposite direction.

For example, the European Patent Application EP-A-0 872 692, in the name of the same Applicant, describes a similar door hinge for compartments of furniture pieces, and particularly for oven compartments, in which a first hinge support being fixed to the compartment structure is rotatably constrained to a second hinge support being fixed to the door, and comprises an idle wheel acting as the follower for a cam-shaped arm, which is, in turn, hinged to said second hinge support in a point away from the hinge point of the two supports. The rotation of the cam relative to the second support, which rotation occurs upon opening/closing the door, also defines the sliding of a moving element, or slider, which is suitably constrained to an end of the cam, relative to the second hinge support. The movement of this slider relative to the latter is further hindered, in a forward direction thereof, by a spring being interposed between the second support and the slider, and it is facilitated by the spring in the opposite direction. This spring, more particularly, counteracts the opening of the door relative to the oven compartment and facilitates closing the latter.

A similar hinge for oven doors is described in the European Patent Application EP-A-0 738 817, also in the name of the Applicant, wherein the first hinge support is rotatably constrained to the second hinge support by interposing a suitably shaped spacer.

U.S. Pat. No. 3,123,064, in the name of HARTSON, relates to a hinge of the above-discussed type, wherein the cam follower consists of an idle wheel that is directly mounted to the oven structure and thus only functionally connected to that support of the hinge constrained to the oven structure. Furthermore, one of the ends of the cam of the HARTSON hinge, which is hinged to the hinge support that is fixed to the oven door, is said moving element relative to this support. The cam end is also constrained to a spring extending between this end and a suitable point of the support fixed to the door.

These prior art hinges, though allowing a quite accurate adjustment of the movement of the door relative to the compartment, do not prevent the possible impacts of the door against the compartment structure, when the door reaches one of the end-of-travel positions thereof, particularly the compartment closure end-of-travel position.

For example, when the spring is configured to counteract the opening of the door, preferably by collapsing from the zero (rest) position thereof, when the door is being closed by the user, the thrust given by the spring extending onto the respective moving element of the hinge can impress a considerable speed to the rotation of the door relative to the compartment, thus consequently causing the door to impact against the compartment structure when closing.

To overcome this drawback, it is also known to make hinges for doors covering compartments of furniture items, and particularly ovens, wherein the relative rotation of the two supports of the hinge is adjusted only by interposing a fluidic damper between the supports, without said movement guide means being provided.

For example, the European Patent Application EP-A-0 422 565, in the name of BOSCH SIEMENS, describes a hinge for an oven door in which one or more dampers act such as to hinder opening the door.

It is also known to make a hinge for compartments of furniture items, and particularly a hinge for ovens, of the type being provided with movement guide means comprising a cam and a respective follower, in which an element moving relative to one of the hinge supports is constrained to said cam-follower guide means and is also constrained to a fluidically operated damper, of the type with cylinder and piston, which is arranged such as to counteract one of the moving directions of this moving element.

U.S. Pat. No. 6,789,293, in the name of HABEGGER, teaches to use, on both sides of an oven door, first and second hinges of the type provided with cam-follower guide means, in which the first hinge comprises a spring counteracting the opening movement of the door relative to the oven compartment and in which the second hinge comprises a damper counteracting the closing movement of the door, by increasing the resistance against the movement. In this patent, the damper used is a so-called pneumatic or hydraulic spring, i.e. a cylinder in which the piston, when it is induced to move in at least one given direction of its travel, compresses the fluid sealingly stored within the respective cylinder, and in which this piston is, when the force causing the latter to move in the fluid-compression direction stops, forced to move back to the starting position by the same fluid that had been previously compressed.

Such a damper, though being effective in preventing impacts from occurring when the oven door is being closed, necessarily requires using a spring, suitably configured and calibrated, to steadily hold the piston in the end-of-travel position thereof, in which the fluid is compressed. Furthermore, this type of damper makes the resistance offered to the movement of the piston higher and higher, in the fluid-compression direction, as this piston reaches the expected end-of-travel position thereof, thus making operating the oven door for closing uncomfortable and unnatural to the user.

An object of the present invention is to provide a hinge for compartments of furniture items, and particularly ovens, which does not suffer from the above-cited drawbacks of the prior art.

Another object of the present invention is to provide a hinge for compartment doors, preferably of the type provided with movement guide means, for example with cam and follower, which are connected to at least one damper, which results both simple to make and user-friendly.

A further object of the present invention is to provide a hinge for oven doors, preferably of the type being provided with cam-follower means, in order to adjust the movement of the door, which prevents impacts from occurring against the oven structure when the door is being opened or closed while not requiring unusual efforts to the user in order to be used.

SUMMARY OF THE INVENTION

These and other objects are achieved by the hinge for compartment doors according to the first independent claim and the following dependent claims.

The hinge for a door at least partially covering a compartment, according to the present invention, comprises first and second supports, which are fixed to the compartment structure and door, respectively, or vice versa, which are at least rotatably constrained to each other, and at least one fluidic damper, of the cylinder and piston type, in which the piston is constrained, either directly or indirectly, to said first support, or compartment structure, and in which the cylinder is, either directly or indirectly, constrained to said second support, or compartment door, or vice versa. Advantageously, this damper is of the type with internal flow leakage of the fluid contained therein.

The Applicant has found out that using a fluidically operated cylinder and piston of the type with internal flow leakage of the fluid, i.e. the fluid being induced to flow, with a certain resistance, from one chamber of the cylinder to the other, i.e. from the upstream to the downstream chamber, relative to the direction of the respective movement of the piston moving within the damper cylinder, allows accurately adjusting the resistance offered by the damper, at least in one forward direction of the piston within the cylinder, and thus slowly and continuously closing and/or opening the door and effectively preventing, both in the closing and opening steps, any impacts from occurring between the door and compartment structure, even when wrong manoeuvres are made by the user, such as applying an excessive closing/opening force, or unusual efforts on the door, etc.

According to a preferred aspect of the present invention, the hinge further comprises movement guide means having at least one moving arm engaged with a respective abutment, which are functionally connected to these first and second supports, respectively, or vice versa, and at least one element connected to said movement guide means, which is movable relative to the second support when the door is being moved. The moving element is further constrained to the piston rod of the cylinder-piston fluidic damper, and the second hinge support is fixed to the cylinder of the same damper.

Also in this case, using said movement guide means in combination with the fluidic damper of the type with internal flow leakage of the fluid allows obtaining a hinge that can be easily used by a user, which prevents any impacts from occurring between the door and the respective compartment structure, when the door is being closed or opened.

According to a preferred aspect of the present invention, said damper further comprises at least one region, within the cylinder, which offers a higher resistance to the relative movement, at least in one direction, of the piston, relative to other inner regions of the cylinder. In other words, in this higher-resistance region, preferably defined by the geometrical configuration of the cylinder and/or piston and/or ports of the internal flow leakage for the fluid, the speed, at least in one direction, of the piston results to be reduced, relative to the other cylinder regions, mainly due to the increased resistance against the passage between piston and cylinder walls and/or to the internal flow leakage of the fluid from one chamber to the other, as well as due to the increased pressure of the fluid not yet internally leaked, while the latter is being compressed by the piston. This high-resistance region can consist of a reduced-section cylindrical chamber, with which the damper cylinder is provided at one end thereof, within which a corresponding appendix is engaged, which is also of a reduced-section and provided on the sliding cylindrical body of the piston.

According to another aspect of the present invention, the internal flow leakage of the fluid from the downstream chamber to the upstream chamber of the piston is obtained by means of a through hole being formed in the piston, which is otherwise substantially sealingly mounted within the cylinder. In a preferred embodiment of the cylinder-piston damper, this through hole for internal flow leakage of the fluid comprises an inlet/outlet port for the fluid, which is provided on the side wall of said reduced-section appendix of the piston, while the other outlet/inlet port for the fluid is provided on the opposite base of the piston relative to the one with the reduced-section appendix projecting therefrom.

Thereby, a substantially different resistance can be obtained which is offered by the cylinder-piston damper depending on whether the piston is caused to move in that part of the cylindrical chamber of complete section or in that of reduced section.

According to a further aspect of the present invention, between said moving element and the second support thereof there are interposed elastic means counteracting the sliding of said moving element, at least in the direction corresponding to the opening movement of the door, which are embodied for example by a helical torsion spring.

BRIEF DESCRIPTION OF THE FIGURES

A particular embodiment of the hinge according to the present invention will be now described only by way of non-limiting example, with reference to the annexed figures, in which.

DETAILED DESCRIPTION OF A PREFERRED EMBODIMENT OF THE INVENTION

Figure 1:
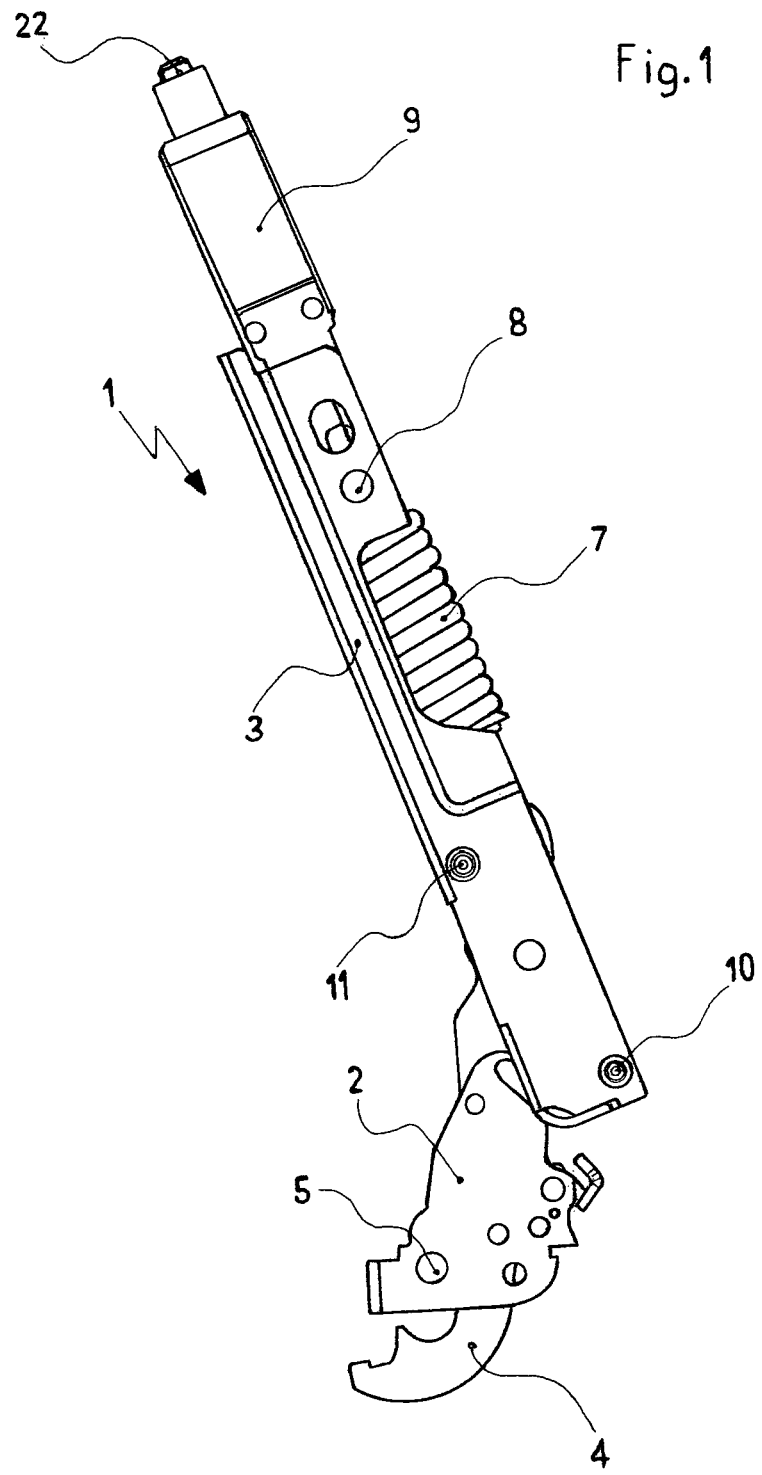
FIG. 1 is a perspective schematic view of a hinge for an oven door, according to a preferred aspect of the present invention.
Figure 2:
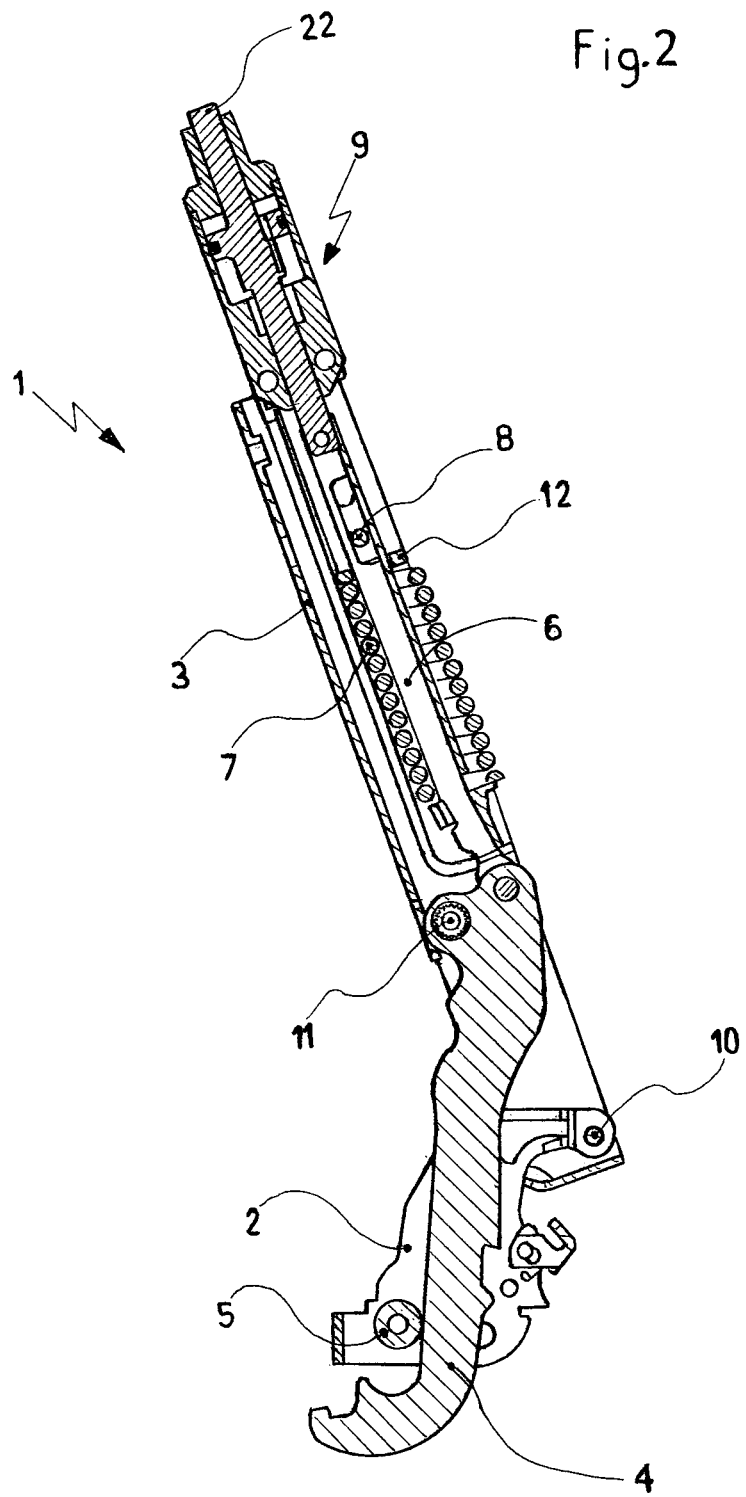
FIG. 2 is a partial schematic sectional side view of the hinge in FIG. 1.

With reference to FIGS. 1 and 2, the hinge 1 for an oven door, according to a particular aspect of the present invention, comprises a first support, or articulation, 2, which is intended to be fixed to the outer structure of the compartment—or compartment—(not shown) of an oven and a second support, or base, 3, which is suitable to be fixed to the frame (also not shown) of a door covering the oven compartment. The first support 2 and second support 3 are hinged to each other, according to the prior art, by means of the pin 10, such that the support 3 is only rotatably constrained to support 2.

The hinge 1 also comprises, according to the prior art, guide means for the relative movement between these supports 2 and 3, and thus between oven door and compartment, of the type in which a moving arm, or sector, 4, which is suitably cam-like shaped, is constrained to the second support 3 and engages with an abutment, or follower, consisting of an idle wheel 5 mounted to the first support 2.

More particularly, the moving arm 4 is hinged to the support 3 by means of a pin 11, suitably spaced by the pin 10 for the relative rotation of the two supports 2 and 3 of hinge 1, and has, along the longitudinal profile thereof, a plurality of recesses and projections that are suitable to be variously engaged with said wheel 5 being mounted idle to the first support 2.

Advantageously, the first support 2, according to the prior art, can be U-shaped such as to house not only the wheel 5 therein, but also, in a sliding manner, the moving arm 4 of said movement guide means.

During the relative rotation of the two supports 2 and 3 of hinge 1, i.e. while the oven door is being opened or closed, the moving arm 4, pulled by the support 3, moves relative to the support 2, thus engaging with the wheel 5, such as to operate such as the cam 4 in engagement with the respective follower 5. The engagement of the arm 4 with the wheel 5 at least partially determines the conditions of the relative movement between the oven door and structure, by imposing for example stable equilibrium positions, not necessarily only coincident with those of full opening and complete closure of the oven compartment by the door, which result to be of use when the oven is operating and/or for the operations of opening and closing the oven door.

As may be seen particularly in FIG. 2, which shows the two supports, 2 and 3, in their end-of-travel position corresponding to the opened position of the oven door, the end of the arm 4 not engaged with the idle wheel 5, is constrained to a reciprocating moving element relative to the second support 3, which element consists particularly of a bar 6 translatory sliding relative to this support 3.

The bar 6, which is constrained to slide within a guide defined by a pin 8 integral with the support 3, acts as a spring guide bar for a spring 7 extended between an end frame of the bar 6 and a block 12 integral with the support 3 by means of this pin 8.

The spring 7, preferably a cylindrical helical torsion spring, is shaped and arranged within the hinge 1 such as to be in the unbiased position thereof when the oven door to which the hinge 1 is mounted is in the compartment-closing position thereof. On the other hand, when this door is in the compartment-opening position thereof, i.e. when the hinge 1 is in the configuration schematically illustrated in FIG. 2, the spring 7 results to be compressed.

Thereby, when the oven door is being opened, the relative rotation of the two supports 2 and 3 about the pin 10, which rotation determines the movement of the cam-shaped moving arm 4 relative to the wheel 5 and the relative rotation of the arm 4 about the pin 11, causes the upward translation of the bar 6 in FIG. 2, in such a direction as to compress the spring 7, which acts such as to counteract this door opening movement, by partially balancing the weight thereof. Similarly, when the oven door is being closed, the translation of the bar 6 in the opposite direction relative to that indicated above is facilitated by the spring 7 which extends to the rest configuration thereof, thus facilitating this door closing operation, by partially balancing, also in this case, the door weight.

A hinge similar to that illustrated herein is described in EP-A-0 872 692, in the name of this Applicant.

It should be observed that, while the hinge 1 described herein provides the two supports 2 and 3 being hinged to each other, the present invention can be also applied to hinges in which the constraint between the first support 2 being fixed to the oven structure, and the second support 3, fixed to the respective door, is of a rotary translational type, i.e. the instantaneous centre of rotation between these supports 2 and 3 translates when the door is moved relative to the oven compartment, such as for example in the so-called variable fulcrum hinges.

Similarly, it should be noted that, as will be understood by those skilled in the art, while movement guide means have been described in which the moving arm 4 acts as a cam and the wheel 5 acts as the respective follower, the alternative use of different movement guide means known in the art, in which an arm, for example acting as the follower or cam, is engaged with a respective abutment, for example acting as the cam or follower, and in which the arm is functionally associated to a support and the abutment is functionally associated with the other support, i.e. the one is either directly or indirectly constrained to the door and the other to the oven structure, does not impair implementing the present invention.

The hinge 1 described herein further comprises a cylinder-piston damper 9 fluidically operated, integral with the second support 3, and of which the piston is translatory operated within the respective cylinder by said moving element relative to support 3, i.e. by the spring guide bar 6. The fluid placed within this damper can be any oil, preferably synthetic, with high viscosity index (for example, with viscosity index higher than 1000 $mm^2/s$ at 25° C), such as for example a high-temperature resistant silicone oil.

It should be noted that the damper 9 described herein can generally be constrained, either directly or by interposing said movement guide means 4, 5, 6, to the two supports 2, 3 of hinge 1, or still be directly constrained to the compartment and respective door to which the hinge 1 is applied, without thereby departing from the scope of protection claimed in the claims below.

Advantageously, according to the present invention, the damper 9 consists of a cylinder-piston damper of the type with internal flow leakage of the fluid, i.e. of the type in which the fluid contained within the cylinder of the damper is induced to internally leak, such as by means of clearances existing between the piston and cylinder inner walls, or by means of outlet holes for the fluid, from the chamber located downstream the piston to the chamber located upstream the piston, during the piston travel in either direction.

Figure 3A:
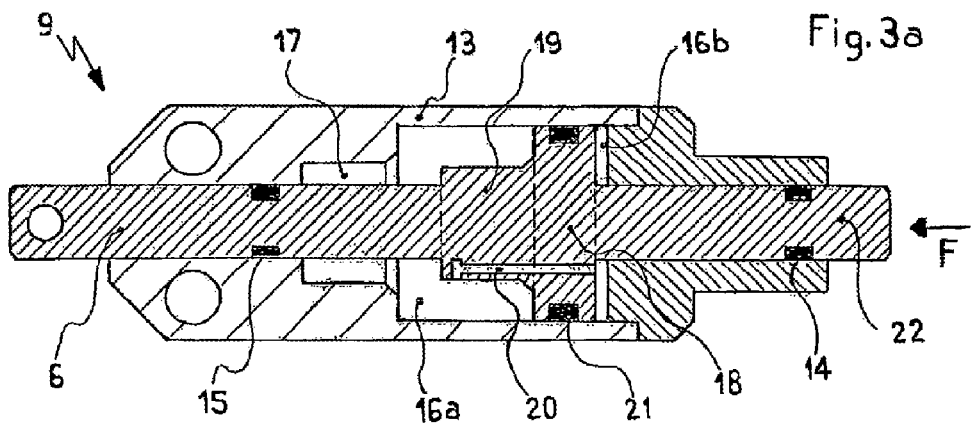
FIG. 3a, 3b, 3c are sectional schematic, and partially cut away views of a damper that can be used in the hinges in FIGS. 1 and 2, in various operating positions of the respective piston, according to a further preferred aspect of the present invention.
Figure 3B:
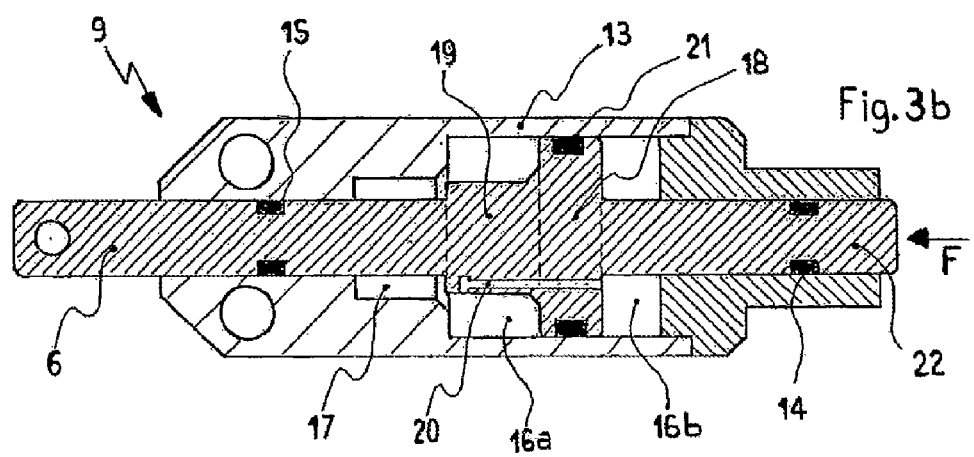
Figure 3C:
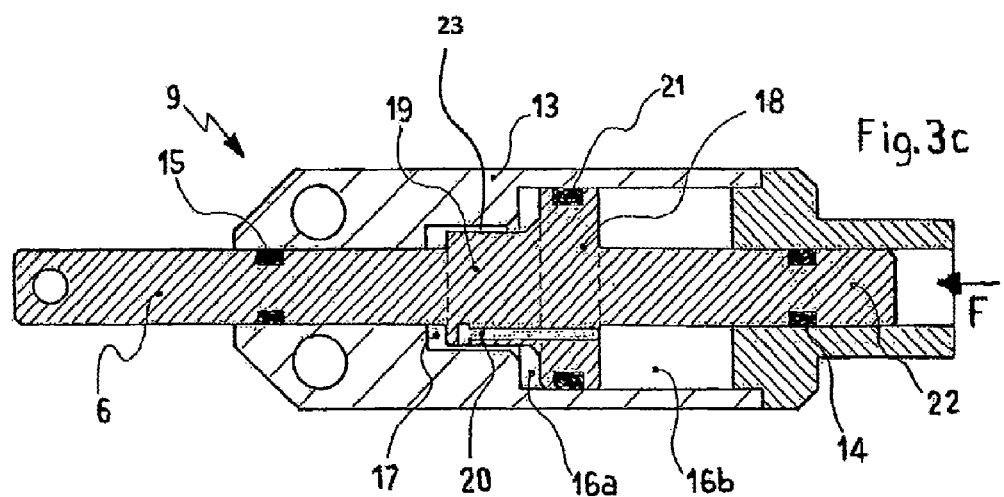

In greater detail, with reference to FIG. 3a-3c, this damper 9 can preferably comprise a cylinder 13, which not necessarily but preferably has a circular section, a piston 18, 19 sliding therein, of which the rod coincides with an end of the bar 6. This bar extends, for reasons of stability and equilibrium of the volumes available for the fluid upstream and downstream the piston 18, 19, to the side opposite the body of the piston 18, 19, to a further bar portion 22, coaxial to bar 6. This bar 22, which projects from a base of the cylinder 13 opposite the base in which said end of the bar 6 is inserted, is guided in translation relative to the damper 9, and thus relative to the support 3 by a guide system constrained by the pin 8 to the support 3.

As stated above, it should be observed that, alternatively, in other not illustrated embodiments of the present invention, the piston rod 18, 19 of the damper 9 can be functionally associated (i.e. directly or indirectly constrained) with the door and the respective cylinder 13 can be functionally associated with the compartment structure to which the door is applied, without thereby departing from the scope of protection of the present patent.

The fluidic seal of cylinder 13 of the damper 9 at the inlet sections of the bars 6 and 22 is ensured by O-rings 15 and 14, of a traditional type, which are made of synthetic material.

The cylinder 13 is internally shaped such as to have a central chamber, partitioned into two varying volume chambers 16a, 16b by the piston 18,19, and an end chamber 17, having a section of a lower area than the area of the section of the central chamber 16a, 16b.

The piston 18, 19 comprises, in turn, a cylindrical body 18, having a section area slightly lower than the section area of said central chamber 16a, 16b of cylinder 13 and a cylindrical appendix 19, projecting from a base thereof, which has a section area slightly lower than the section area of the end chamber 17 of the cylinder 13. This reduced-section cylindrical appendix 19 faces the end chamber 17, which also has a reduced section, such that, during the forward travel of the piston 18, 19, a gradual engagement of the appendix 19 is obtained within the chamber 17.

The cylindrical body 18 of the piston is further fluid-tight mounted, within cylinder 13, by means of an O-ring 21, and the internal flow leakage of the fluid from the one chamber 16a to the other 16b, or vice versa, is ensured by a through hole 20 which substantially joins the base of body 18 of the piston adjacent to the chamber 16b of cylinder 13 with the appendix 19 extending in the corresponding chamber 16a of the cylinder 13, of the piston.

This through hole 20, in greater detail, has an inflow/outflow port for the fluid that is formed on the side wall of the appendix 19 and another inflow/outflow port for the fluid formed on the base of body 18 opposite to that from which the appendix 19 is extended.

The configuration of the end chamber 17 and appendix 19, which have a reduced section relative to chambers 16a, 16b and body 18, respectively, the clearances, i.e. the difference in section, between the appendix 19 and chamber 17, as well as the arrangement of the inflow/outflow ports of the through hole 20 for the fluid internal leakage from the chamber 16a to chamber 16b, or vice versa, entail the definition of an inner region of the cylinder 13, i.e. that of the end chamber 17, in which a reduction in the fluid flow section between piston, cylinder inner walls and internal—leakage hole 20 occurs, at least during the forward movement of the piston in one direction within the cylinder 13. This region is, as will be understood below, a region of the cylinder 13 that offers, relative to other inner regions of the cylinder 13, a higher resistance against the forward movement in one direction, of the piston 18, 19, i.e. in which the speed of the piston 18, 19, in the direction of inserting the appendix 19 within the end chamber 17, is reduced, at the same force applied to the rod 6, relative to that reached by the piston 18, 19 within the chamber 16a, 16b.

In greater detail, with reference to the steps in which the piston 18, 19 moves from the end of the cylinder 13 opposite the chamber 17 to this chamber 17, which are schematically illustrated from FIG. 3a to FIG. 3c, when the piston 18, 19 is in its position illustrated in FIG. 3a and is biased by a force F, acting as depicted in FIGS. 3a-3c, it starts its forward travel to the end chamber 17, with a certain speed given by the intensity of the force F, sliding friction of the O-rings 14, 15, 21, and fluid dynamic resistance offered by the fluid within the cylinder 13. This fluid dynamic resistance, as is known, is mainly a function of the volume of the fluid being displaced, of the viscosity (and possibly, compressibility) thereof and of the fluid flow section during the internal flow leakage from chamber 16a to chamber 16b.

Particularly, in the particular embodiment of the invention described herein, before the appendix 19 of the piston reaches the reduced-section end chamber 17 (FIG. 3a), this fluid flow section during the internal leakage of the same is substantially given by the section of the through hole 20 and by the clearance existing between the appendix 19 and chamber 16a, which clearance is defined by the different sections of the appendix 19 and chamber 16a, 16b (or, in case the cylinder 13 and piston 18, 19 have a circular section, by the different diameters of the appendix 19 and chamber 16a).

It should be observed that, as shown in FIGS. 3a-3c, the area of this clearance between the appendix 19 and chamber 16a, 16b is much larger than the section area of the internal flow leakage hole 20.

When the appendix 19 reaches the reduced-section end chamber 17, as may be seen in FIG. 3b, although the inflow port (on appendix 19) of the internal leakage hole 20 is still within the chamber 16a, the section of passage of that fluid volume that is compressed within the chamber 17 by the appendix 19, and that internally leakage within the chamber 16a to the inflow port of hole 20, is given by the clearance 23 existing between the appendix 19 and the inner walls of the chamber 17. This clearance 23, which in the case of a cylinder 13 and piston of a circular section is a function of the different diameter between the appendix 19 and chamber 17, is sensibly reduced relative to the clearance existing between the appendix 19 and chamber 16a, 16b.

The reduction in the fluid flow section during the internal flow leakage of the latter, which is due to the appendix 19 engaging with the chamber 17, entails a sensible increase in the resistance offered by the fluid against the forward movement of the piston 18, 19, with a consequent reduction in the forward speed of the same, at the same intensity of force F applied thereto.

When the inflow port of the internal leakage hole 20 located on the side wall of the appendix 19 also engages within the end chamber 17 (see FIG. 3c), the fluid flow section during the internal flow leakage of the latter is given by said clearance 23, also for that portion of fluid still being within the chamber 16a. This fluid passageway section, further reduced, increases the resistance offered by the fluid when the piston 18, 19 moves forward.

After the appendix 19 has reached its end-of-travel position within chamber 17, coincident with the closed position of the oven door, as will be seen below, any application on the rod 6 of a force directed in the opposite direction to that indicated in FIGS. 3a, 3b and 3c, causes the movement, in a backward travel, of the piston 18, 19 to the end of the cylinder 13 opposite to that in which the chamber 17 is located. In this backward travel, coincident with the door opening operation, the flow section of the fluid displaced during the internal flow leakage within the hole 20, in this case from the chamber 16b to chamber 17 and subsequently to chamber 16a, is not subjected to substantial changes, and furthermore the displacement of the piston is facilitated by the weight of the door, and consequently in the backward travel, the translation speed of the piston 18, 19 within the cylinder 13 is slowed down by a smaller extent than the forward travel.

This means that, during the forward travel of the piston to the chamber 17, an increase occurs in the resistance offered by the fluid when the appendix 19 engages with the chamber 17, with a consequent reduction in the forward speed of the piston 18, 19, during the backward travel of the piston 18, 19 a reduced increase occurs in the resistance offered by the fluid, which is further compensated by the force of gravity acting on the door, and thus decreases are reported in the moving speed of the piston which are lower than those recorded in the forward travel.

The arrangement of the end chamber 17 within the cylinder 13 and the constraint between the piston rod 18, 19 and spring guide bar 6 (or other sliding element of the hinge 1), as stated above and understood by comparing FIG. 3a-3b with FIG. 2, are such that during the oven door opening movement, which ends with the configuration of the hinge 1 illustrated in FIG. 2, the bar 6, by moving upwards in FIG. 2, defines a backward travel of the piston 18, 19 in an opposite direction to that of chamber 17, i.e. thus disengaging from the latter, whereas during the oven door closing movement, the bar 6, by moving downwards in FIG. 2, causes the piston 18, 19 to move in a forward travel to the end chamber 17.

In other words, in the particular embodiment of the invention as illustrated in the figures annexed herein, the piston 18, 19 meets said high-resistance region of cylinder 13, in which a dramatic increase in the resistance offered by the fluid and a considerable decrease in the translation speed of the 18, 19 occur, only during the oven door closing movement, whereas during the door opening movement, the piston 18, 19 is disengaged from this chamber 17 without meeting other regions of the cylinder 13 where a similar resistance increase may occur.

In brief, the damper 9 acts such as to offer a considerable resistance only against the closure of the oven door, when a certain angular position of the door is passed relative to the oven (angular position corresponding to the initial engagement position of the appendix 19 with chamber 17 in the piston forward movement), whereas it offers a smaller resistance to the opening of the door, also due to the action of the force of gravity acting on the latter, and to the closure of the door prior to said angular position.

Also considering that the shape and arrangement of the spring 7 relative to the bar 6 and arm 4, as described above, is such as to offer resistance—by compressing relative to the rest configuration thereof—against the opening of the door and facilitate—by extending—the closure of the door relative to the respective oven compartment, the combination of damper 9 and spring 7 substantially provides a shock-absorber.

It should be noted that, however, while a region 17 has been described having a high resistance against the sliding in one direction of the piston 18, 19 relative to the respective cylinder 13, which region is obtained by means of the particular geometrical configuration of the cylinder 13 and piston 18, 19, as well as the internal leakage sections 20 of the fluid, other embodiments of this high-resistance region can be alternatively used. For example, by suitably controlling the flow rate of the internal flow leakage throughout the movement of the piston 18, 19, and using a fluid having a suitable viscosity, a predefined and substantial increase can be obtained in the resistance offered to compression by the fluid that has not yet internally leaked—the volume of which is controlled by the amount of the previous internal leakage—in an inner, not shaped region of cylinder 13 proximate to an end-of-travel position of the piston 18, 19.

Referring back now to the particular hinge 1 illustrated in the attached figures, when this hinge 1 is used, starting from the closed position of the oven door, the physical behaviour of the hinge 1 described above is such that, during the opening of the door, the spring 7 is compressed, the cam arm 4, by engaging with the follower 5, can define stable positions along the opening path, and together with the spring 7, it can contribute balancing the weight of the door when opening (it should be remembered that upon opening, due to the arrangement of the pin 10 of the hinge 1 in an oven, the force of gravity would cause an undesired acceleration of the door movement), as well as the bar 6 moves relative to the support 3, upwards in FIG. 2, thus operating the piston 18, 19 in a backward travel thus disengaging from the end chamber 17. The movement of this opening of the door is mainly hindered by the compression of the spring 7, but also by the resistance offered by the fluid within the chamber 16b of cylinder 13 of the damper 9, such as to avoid any impacts of the door against the oven structure in the full opened position of the door.

On the contrary, from the full opened position of the door, the rotation of the latter upon closure causes the extension of the spring 7 to the rest position thereof, which facilitates the rotation of the door thus contributing to lift the weight of the door, the movement, in the opposite direction, of the cam arm 4 relative to the respective follower 5, with the relative control of the door closing movement, and the translation of the bar 6 relative to the support 3, downwards in FIG. 2, with consequent displacement of the piston 18, 19 within the cylinder 13 in a forward travel to the end chamber 17 (depicted in FIGS. 3a-3c). During this oven door closing movement, when said angular position of the door is reached, which corresponds to the initial engagement position of the appendix 19 with the end chamber 17, due to the particular configuration of the damper 9, an increase is observed in the resistance offered against the forward movement of the piston 18, 19 within the cylinder 13, and thus an increase in the resistance of the door against rotation relative to the oven structure, which prevents any impacts of the door against the oven when this door reaches its completely closed position and also allows a continuous, slow and controlled of the door.

As may be understood from the above detailed description, the hinge according to the present invention advantageously allows:

a) closing the door in a slow and continuous manner without the user being required to apply an excessive force. In fact, in order to close the door, the user must accompany the door to a determined closure angle, which can be adjusted as a function of the shape of the cam arm 4 and elastic constant of the spring 7 used, and then release it: the door will close without further external forces, with a slow and continuous movement, due to the action of the spring 7 on the bar 6, and thus on the piston 18, 19, and to the continuous and controlled internal flow leakage of the fluid within the cylinder 13;

b) opening the door in a slow and continuous manner, without the user being required to apply unusual forces. In fact, in order to open the door, the user must accompany the door to a certain opening angle, which can be adjusted as a function of the elastic constant of the spring 7, weight of the door and shape of the cam arm 4, and then release it: the door will then open by itself, with a slow and continuous movement, due to the action of the force of gravity (i.e. to the door weight and continuous and controlled internal leakage of the fluid within the cylinder 13; and c) thus preventing any impacts, both in the door closure and opening steps, of the door against the compartment structure, even when wrong maneuvers are made by the user.

The invention claimed is:

1. A hinge for a door at least partially covering a compartment, comprising:

first and second supports that are fixed to a compartment structure and to a door, respectively, said first and second supports being at least rotatably constrained to each other;

an elastic means counteracting a movement of said first support relative to said second support;

at least one cylinder-piston fluidic damper comprising a piston configured to be constrained to said first support or said compartment structure, and a cylinder configured to be constrained to said second support or said door;

wherein said at least one damper allows internal flow leakage of the fluid contained therein, said cylinder comprising a chamber of reduced section placed at one end thereof and defining a higher-resistance region, wherein a higher resistance is offered against relative movement, at least in one direction, of said piston, relative to other inner regions of said cylinder and said piston;

said piston comprising a cylindrical body, sliding within said cylinder, and having, on a first side of a base thereof, at least one cylindrical appendix of reduced section, which is configured to be non-sealingly engaged within said chamber of reduced section of the cylinder, and said piston is sealingly sliding within said cylinder and comprises a through hole for internal flow leakage of said fluid having an inlet port located on a side wall of said cylindrical reduced-section appendix and an outlet port formed on a second side of the base of said cylindrical body opposite to the first side of the base from which said appendix projects.

2. The hinge according to claim 1, wherein it comprises movement guide means having at least one moving arm being engaged with a respective abutment, which are functionally connected to said first and second supports, respectively, and at least one moving element connected to said movement guide means, which is moving relative to said second support during the movement of said door, said at least one moving element being constrained to a rod of said piston of said at least one fluidic cylinder- piston damper, and said cylinder being fixed to said second support.

3. The hinge according to claim 1, wherein in said higher-resistance region of the at least one damper, said cylinder and said piston are configured to define a variation of fluid flow section at least in one direction of travel of said piston.

4. The hinge according to claim 2, wherein said inner higher-resistance region is located at an end of said cylinder towards which said piston moves when said at least one moving element moves relative to said second support during a movement of said door to at least partially close said compartment.

5. The hinge according to claim 2, wherein between said at least one moving element and said second support said elastic means are interposed which counteract a sliding movement, at least in one direction, of said at least one moving element.

6. The hinge according to claim 2, wherein said elastic means counteract a sliding movement of said at least one moving element relative to said second support at least while said door is moving to at least partially open said compartment.

7. The hinge according to claim 2, wherein said at least one moving element coincides with an end of said at least one moving arm with which said movement guide means are provided.

8. The hinge according to claim 2, wherein said at least one moving element is constrained to said at least one moving arm with which said movement guide means are provided.

9. The hinge according to claim 2, wherein said at least one moving arm of said movement guide means comprises at least one portion acting as a cam and said respective abutment comprises at least one follower for said portion acting as a cam.

10. An oven door comprising the hinge of claim 1.

11. A cabinet door comprising the hinge of claim 1.

\* \* \* \* \*